(12) United States Patent
Steele

(10) Patent No.: US 11,542,132 B2
(45) Date of Patent: Jan. 3, 2023

(54) ANCHOR FOR ATTACHING TO A SHEET OF RIGID SUPPORT MATERIAL AT A HOLE FORMED THEREIN AND RELATED METHOD

(71) Applicant: Micheal Roland Steele, Lebret (CA)

(72) Inventor: Micheal Roland Steele, Lebret (CA)

( * ) Notice: Subject to any disclaimer, the term of this patent is extended or adjusted under 35 U.S.C. 154(b) by 0 days.

(21) Appl. No.: 17/340,653

(22) Filed: Jun. 7, 2021

(65) Prior Publication Data

US 2021/0387836 A1 Dec. 16, 2021

Related U.S. Application Data

(60) Provisional application No. 63/037,716, filed on Jun. 11, 2020.

(51) Int. Cl.
*B66D 3/00* (2006.01)
*F16B 2/04* (2006.01)

(52) U.S. Cl.
CPC ............... *B66D 3/006* (2013.01); *F16B 2/04* (2013.01)

(58) Field of Classification Search
CPC ............... B66D 3/006; F16B 2/04; F16B 2/12
See application file for complete search history.

(56) References Cited

U.S. PATENT DOCUMENTS

| | | | | |
|---|---|---|---|---|
| 7,603,818 | B2 * | 10/2009 | Guthrie | E02D 5/74 52/149 |
| 2008/0112764 | A1 * | 5/2008 | Blank | E02D 5/80 405/259.1 |
| 2010/0193660 | A1 * | 8/2010 | Colla | A01K 97/01 248/552 |
| 2011/0286805 | A1 * | 11/2011 | Beagle | B63B 21/24 405/217 |
| 2016/0122967 | A1 * | 5/2016 | Burnor | E02D 5/80 405/259.1 |

(Continued)

FOREIGN PATENT DOCUMENTS

| | | | |
|---|---|---|---|
| CA | 2359094 A1 | * | 5/2002 |
| RU | 108474 U1 | * | 9/2011 |

OTHER PUBLICATIONS

Billet4×4 pull-pal winch anchor sold on amazon first available date: Oct. 13, 2011 ASIN No. B005VHNC16, link: https://www.amazon.com/BILLET4X4-Pull-PAL-Winch-Anchor-4X4RECOVERY/dp/B005VHNC16?th=1 (Year: 2011).*

(Continued)

*Primary Examiner* — Terrell L McKinnon
*Assistant Examiner* — Ding Y Tan
(74) *Attorney, Agent, or Firm* — Christopher J. Dynowski; Ryan W. Dupuis; Ade & Company Inc.

(57) ABSTRACT

An apparatus for use with a sheet of rigid support material at a hole formed therein through a thickness of the sheet to provide an anchoring point at a proximal face of the sheet for anchoring an object thereto comprises a frame member supporting a face-engagement member for engaging a distal face of the sheet which is spaced from the proximal face by the thickness of the sheet, so as to resist removal from within the hole by the object anchored to the apparatus, and a buttress member also supported on the frame member for buttingly engaging a peripheral wall of the hole so as to resist movement transversely to a thickness direction of the sheet.

21 Claims, 3 Drawing Sheets

(56) References Cited

U.S. PATENT DOCUMENTS

2021/0237525 A1\* 8/2021 Fitzgerald ................ B60D 1/58

OTHER PUBLICATIONS

Mitchell McInnis youtube video tiled: "Ice Pirate Anchor" dated Feb. 7, 2020, https://www.youtube.com/watch?v=oB559P23_uQ (Year: 2020).\*
Billet pull-pal winch anchor sold on amazon dated Oct. 2011, https://www.amazon.com/BILLET4X4-Pull-PAL-Winch-Anchor-4X4RECOVERY/dp/B005VHNC16 (Year: 2011).\*
Digger D-30 ice angel sold on amazon dated Nov. 2013, https://www.amazon.ca/Digger-D-30-5368-0012-ANGELS-PAIR/dp/B00U6HIDU6 (Year: 2013).\*
Glacier ice anchors youtube video dated Mar. 2015, https://www.youtube.com/watch?v=KGxUrruKc8w (Year: 2015).\*
All-TIE Anchor pulls truck out Winching with no Truck just portable winch anchor point, youtube video dated Jan. 23, 2017 by Good N Useful supply; https://www.youtube.com/watch?v=L9Jm-Gcv-og (Year: 2017).\*
Getting Unstuck with the Pull Pal Land Anchor youtube video dated Jun. 25, 2016 by o3djeeps, weblink: https://www.youtube.com/watch?v=Bk-aCl-uoDl (Year: 2016).\*
ExtremeTerrain.com redrock 4×4 12000lb ground anchor, web archive date from archive.org: Mar. 10, 2016 (Year: 2016).\*
Mitchell McInnes, "Ice Pirate Anchor", Feb. 7, 2020, YouTube.com, https://www.youtube.com/watch?v=oB559P23_uQ.

\* cited by examiner

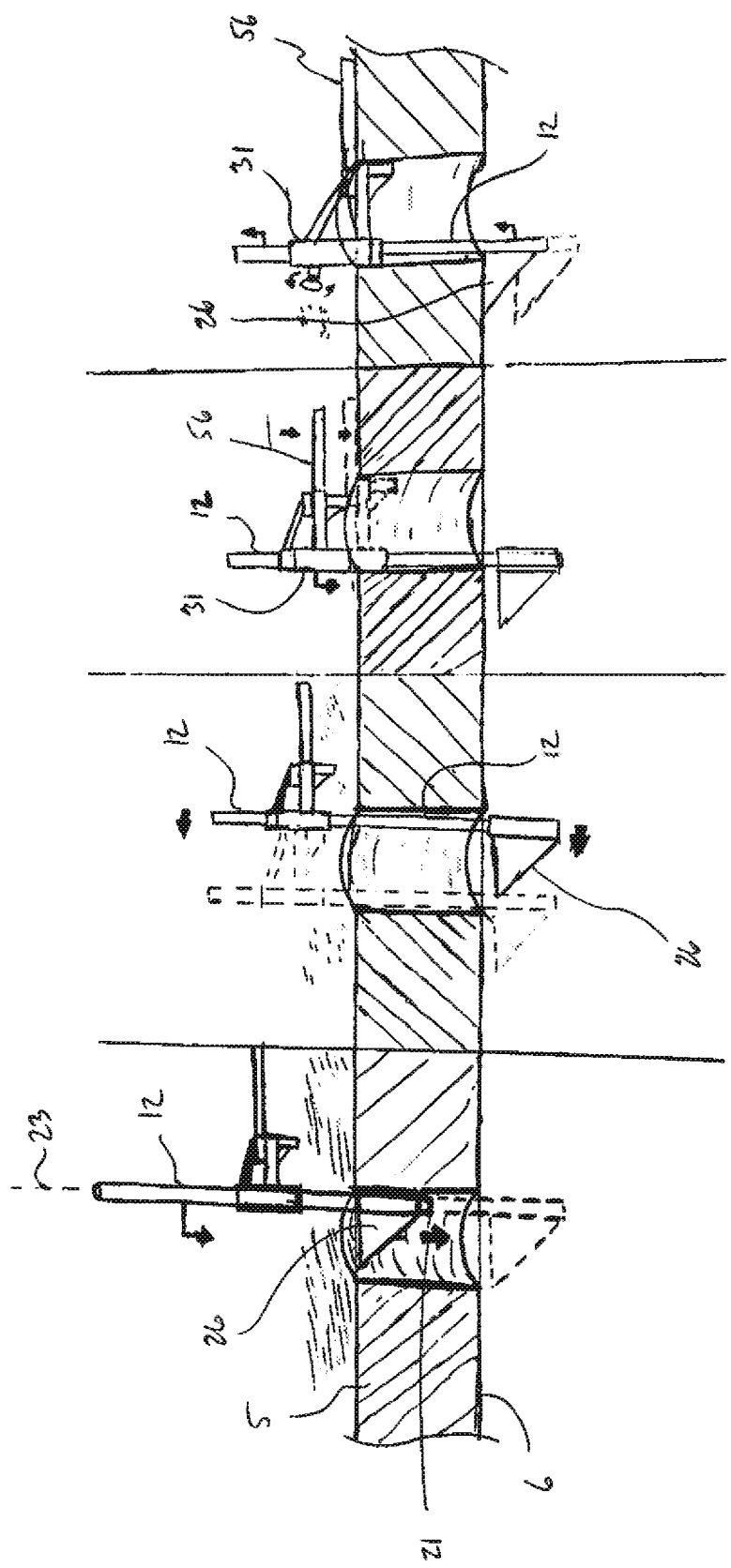

ANCHOR FOR ATTACHING TO A SHEET OF RIGID SUPPORT MATERIAL AT A HOLE FORMED THEREIN AND RELATED METHOD

This applications claims the benefit under 35 U.S.C. 119(e) of U.S. Provisional application Ser. No. 63/037,716 filed Jun. 11, 2020.

FIELD OF THE INVENTION

The present invention relates to an apparatus for attaching to a sheet of rigid support material at a hole formed therein through a thickness of the sheet to provide an anchoring point at a proximal face of the sheet for anchoring an object thereto, and more particularly to such an apparatus which includes both a member for engaging a distal face of the sheet and a member for engaging a peripheral wall of the hole.

BACKGROUND

It is desirable to provide an apparatus which can be affixed to a sufficiently rigid support material to cooperate therewith to provide a fixedly located anchoring point to which an object can be connected. In one example, it is desirable to provide such an anchoring point on a sheet of ice for connecting a land vehicle which is stuck, so that the land vehicle can be rescued by interconnecting a tensionable member between the stuck vehicle and the anchoring point and reducing a length of the subsequently tensioned member therebetween to displace the vehicle towards the anchoring point and out from where it is stuck.

SUMMARY OF THE INVENTION

According to an aspect of the invention there is provided an apparatus for use with a sheet of rigid support material having a proximal face, an opposite distal face spaced from the proximal face by a thickness of the support material, and a hole having a peripheral wall formed through the thickness of the support material such that the hole is open at the proximal and distal faces of the sheet to provide an anchoring point at the proximal face of the sheet for anchoring an object thereto, comprising:

a frame member having longitudinally opposite first and second ends and being transversely sized and shaped in a manner so as to enable a first portion of the frame member defining the first end thereof to be passed from a position at or adjacent the proximal face of the sheet and into the hole in an insertion direction towards the distal face when a longitudinal axis of the frame member, along which the first and second ends lie, is oriented generally parallel to a thickness direction of the sheet oriented from the proximal face to the distal face, such that the frame member can be arranged in an inserted position relative to the hole in which the frame member is substantially in the hole, the first end of the frame member is located at or adjacent the distal face of the sheet and the second end of the frame member is located at or adjacent the proximal face of the sheet, and the longitudinal axis of the frame member is generally parallel to the thickness direction of the sheet;

a first face-engagement member supported on the frame member generally at the first end thereof and arranged for passing through the hole with the first end of the frame member in the insertion direction such that the first face-engagement member is disposed outside the hole in the inserted position of the frame member;

the first face-engagement member defining a contact surface disposed to one side transversely of the frame member and arranged to face generally in a longitudinal direction of the frame member towards the second end thereof for engaging the distal face of the sheet in a working position of the first face-engagement member to resist removal in an opposite direction to the insertion direction out of the hole;

a buttress member supported on the frame member at a longitudinally spaced location from the first face-engagement member in said longitudinal direction towards the second end of the frame member;

the buttress member being arranged to be located in the hole with the frame member in the inserted position thereof and projecting transversely outwardly from the frame member to a free end of the buttress member for abutting the peripheral wall of the hole at a first location thereon in a working position of the buttress member, the buttress member being arranged such that, when the free end of the buttress member is in butting engagement with the peripheral wall of the hole at the first location in the working position of the buttress member, the frame member is located generally at the peripheral wall at a second location thereon which is substantially diametrically opposite to the first location and the apparatus at a substantially diametrically opposite location to the free end, relative to the longitudinal axis, is located in butting engagement with the peripheral wall of the hole at said second location thereon so as to resist movement relative to the hole in a transverse direction between the free end and the substantially diametrically opposite location on the apparatus; and an attachment arrangement for coupling the object to the apparatus.

This arrangement provides features which act to resist movement of the apparatus both transversely to the thickness direction within the hole and out of the hole as the object connected to the apparatus generally exerts an applied force thereon having both a first force component along the proximal face and a second force component normal to the proximal face.

Preferably, the free end of the buttress member extends angularly of the longitudinal axis of the frame member from a first side of the free end to a second side thereof.

Preferably, the free end extends from the first side to the second side through a prescribed angle which is between about 35 degrees and about 80 degrees relative to the longitudinal axis. Thus, the buttress member and abutted frame member can act to resist movement transversely to the thickness direction when the first component of the externally applied force of the object is not directed from the frame member and across to the free end of the buttress member.

In one arrangement, the prescribed angle is between about 45 degrees and about 60 degrees.

In one arrangement, the free end comprises a smooth end surface for butting engagement with the peripheral wall of the hole and a plurality of projections at spaced locations carried on the end surface at angularly spaced positions of the longitudinal axis of the frame member for biting into the support material at the peripheral wall in the working position of the buttress member. Thus the free end of the buttress member acts not only to abut the peripheral wall but also to embed into same.

In one arrangement, the buttress member includes a projecting portion defining the free end and disposed substantially to one side transversely of the frame member and a frame receiving portion connected to the projecting portion and encompassing a transverse periphery of the frame member such that a location on the frame receiving portion substantially diametrically opposite to the free end is in butting contact with the peripheral wall of the hole at the second location thereon in the working position of the buttress member.

In such an arrangement, preferably the frame receiving portion of the buttress member is movably supported on the frame member for movement longitudinally therealong.

Preferably, the contact surface of the first face-engagement member is arranged at an angularly spaced position from the free end of the buttress member relative to the longitudinal axis of the frame member.

In one arrangement, the contact surface of the first face-engagement member is located on a substantially diametrically opposite side of the frame member to the buttress member so as to engage the sheet of rigid support material at a common angular location as the frame member relative to the longitudinal axis. Thus the abutted frame member and first face-engagement member cooperate to resist against removal of the frame member from within the hole by torqueing about the buttress member.

The first face-engagement member may define a guide surface arranged to face generally in the insertion direction and which is inclined transversely outwardly and longitudinally in the longitudinal direction towards the second end of the frame member so as to guide the first face-engagement member into the hole in the insertion direction.

Preferably, the apparatus includes a second face-engagement member carried by the frame member at a longitudinally spaced location from the first face-engagement member in said longitudinal direction towards the second end of the frame member, such that the second face-engagement member is disposed outside the hole at the proximal face of the sheet in the inserted position of the frame member, and defining a contact surface disposed to one side transversely of the frame member and which is arranged to face in an opposite direction to said longitudinal direction for engaging the proximal face of the sheet in a working position of the second face-engagement member so as to cooperate with the contact surface of the first face-engagement member to effect a clamping action on the sheet.

Preferably, the contact surface of the second face-engagement member is arranged at a substantially common angular location as the free end of the buttress member relative to the longitudinal axis of the frame member. This further resists against removal of the frame member from within the hole by torqueing about the buttress member.

In one arrangement, the contact surface of the second face-engagement member is arranged at an angularly spaced position from the contact surface of the first face-engagement member relative to the longitudinal axis of the frame member. In one such arrangement, the contact surface of the second face-engagement member is disposed on a substantially diametrically opposite side of the frame member to the contact surface of the first face-engagement member.

In one arrangement, the buttress member is movably secured on the frame member for movement longitudinally therealong, and the second face-engagement member is mounted on the buttress member so that the second face-engagement member is disposed in the working position thereof when the buttress member is disposed in the working position thereof.

In one arrangement, two stabilizer arms carried by the frame member at longitudinally spaced locations from the first face-engagement member so as to be arranged at a location externally of the hole in the inserted position of the frame member, the stabilizer arms extending transversely outwardly from the frame member in substantially opposite directions to one another for engaging the proximal face of the sheet and being located at angularly spaced locations from the contact surface of the second face-engagement member relative to the longitudinal axis of the frame member.

Preferably, each of the stabilizer arms is located at an angularly spaced position from the contact surface of the first face-engagement member relative to the longitudinal axis of the frame member.

The buttress member may include a bracing member extending transversely inwardly from the free end towards a location along the frame member which is longitudinally spaced in the longitudinal direction towards the second end.

In one such arrangement a plurality of the bracing member are provided at longitudinally opposite locations on either side of the buttress member.

According to another aspect of the invention there is provided a method of anchoring an object to a sheet of rigid support material having a proximal face, an opposite distal face spaced from the proximal face by a thickness of the support material, and a hole having a peripheral wall formed through the thickness of the support material such that the hole is open at the proximal and distal faces of the sheet, comprising:

providing an apparatus including:
  a frame member supporting at one end thereof a first face-engagement member for engaging the distal face of the sheet; and
  a buttress member to be supported on the frame member for engaging the peripheral wall of the hole, the buttress member having a projecting free end;
passing the first face-engagement member supported on the frame member through the hole from a position at or adjacent the proximal face of the sheet to a position at or adjacent the distal face so as to locate the first face-engagement member in a position suitable for engaging the distal face while the frame member extends through the hole to the proximal face;
while being supported on the frame member, arranging the free end of the buttress member in butting engagement at a first location on the peripheral wall of the hole, while the first face-engagement member is disposed in contact with the distal face, so as to locate a substantially diametrically opposite portion of the apparatus to the free end in butting engagement at a substantially diametrically opposite location on the peripheral wall of the hole; and
connecting the object to the apparatus so as to anchor the object to the sheet of rigid support material.

The method may further include providing the apparatus having a second face-engagement member to be carried by the frame member for engaging the proximal face of the sheet, and arranging the second face-engagement member in engagement with the proximal face so as to effect with the first face-engagement member engaged with the distal face of the sheet a clamping action on the sheet.

BRIEF DESCRIPTION OF THE DRAWINGS

The invention will now be described in conjunction with the accompanying drawings in which:

FIGS. 3A through 3D illustrate a mounting process for attaching the arrangement of FIG. 1 to a sheet of the rigid support material.

In the drawings like characters of reference indicate corresponding parts in the different figures.

DETAILED DESCRIPTION

Figure 1:
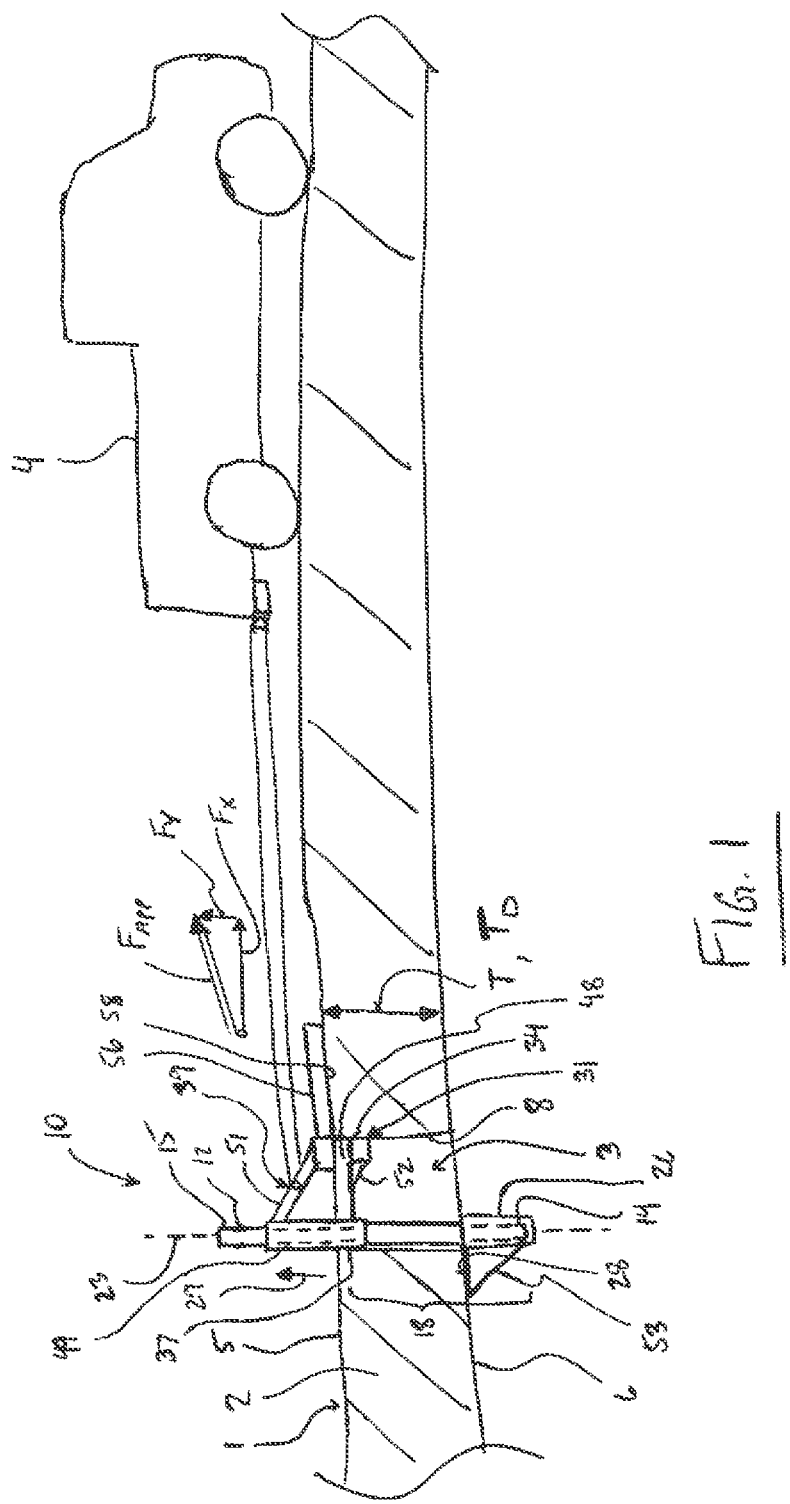
FIG. 1 is a schematic elevational view of an arrangement of apparatus according to the present invention.

The accompanying figures show an apparatus 10 for use with a sheet 1 of rigid support material 2 at a hole 3 formed therein through a thickness T of the sheet to provide an anchoring point at a proximal face 5 of the sheet for anchoring an object thereto, for example a land vehicle 4 as schematically shown in FIG. 1 which is stuck (so that the vehicle can be subsequently rescued) or a temporary structure to be erected upon the sheet. For example, the land vehicle may be a truck, snowmobile, all-terrain vehicle (ATV) or other type of vehicle which is arranged for movement across a ground surface.

Generally speaking, and referring to FIG. 1, the sheet 1 of rigid support material comprises the proximal face 5, an opposite distal face 6 spaced from the proximal face by the thickness T of the support material 2, and the hole 3 having a peripheral wall 8 formed through the thickness T of the support material such that the hole 3 is open at the proximal and distal faces 5, 6 of the sheet. In the example of the stuck land vehicle, the sheet of rigid support material may be a sheet of ice. Typically, the hole 3 is circular in cross-sectional shape and extends along an axis which is substantially perpendicular to each of the proximal and distal faces which are generally planar and parallel to one another. Normally the hole when formed has a uniform cross-section from one face of the sheet such as at 5 to the other at 6.

Figure 2:
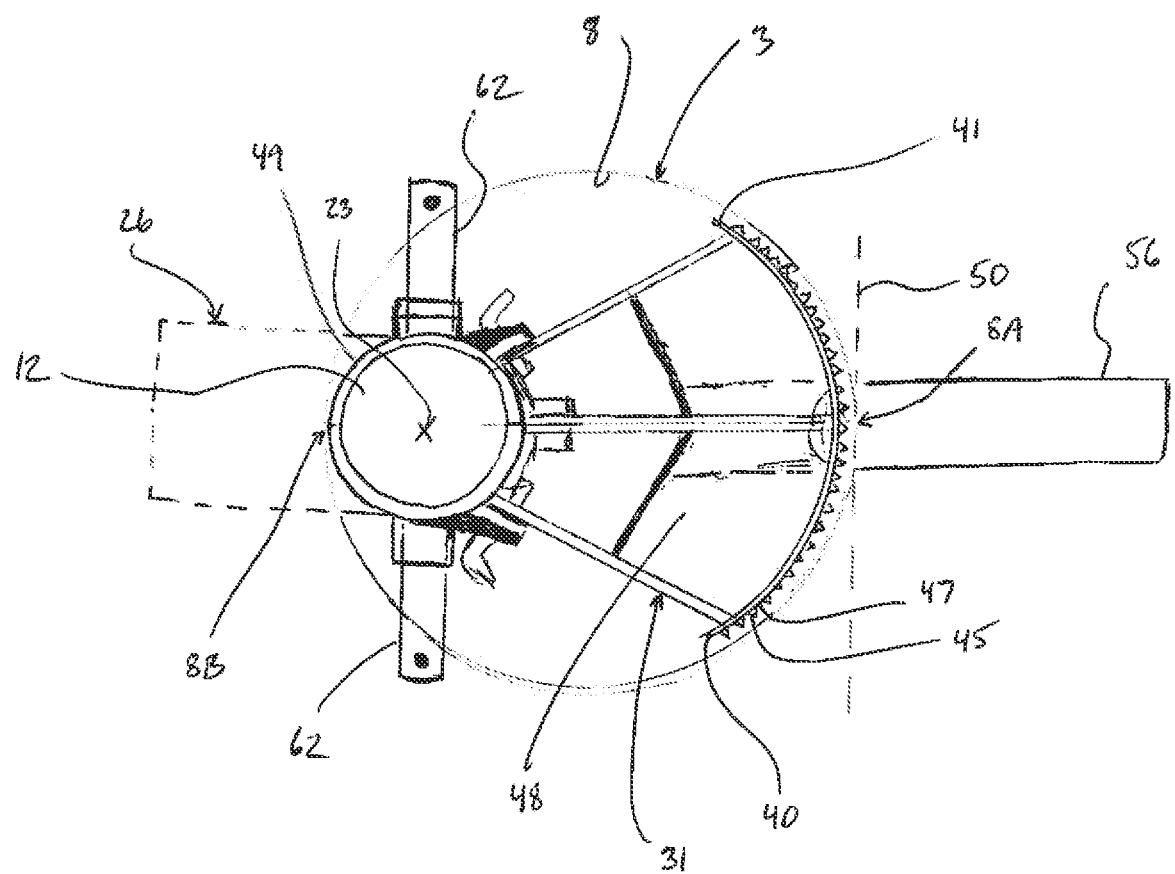
FIG. 2 is a schematic top plan view of the arrangement of FIG. 1.

Referring to FIGS. 1, 2 and 3A, the apparatus 10 comprises a frame member 12 which has longitudinally opposite first and second ends 14, 15 and which is transversely sized and shaped in a manner so as to enable a first insertion portion 18 of the frame member, which defines the first end 14, to be passed from a position at or adjacent the proximal face 5 of the sheet and into the hole 3 in an insertion direction 21 (FIG. 3A) towards the distal face 6 when a longitudinal axis 23 of the frame member, along which the first and second ends 14, 15 lie, is oriented generally parallel to a thickness direction $T_D$ of the sheet where the thickness direction $T_D$ is oriented from the proximal face 5 to the distal face 6. In the illustrated arrangement, the frame member 12 is longitudinally elongated and generally is sized smaller in a transverse direction than the hole 3 formed in the sheet 1 so as to be receivable therein. Also, the frame member 12 of the illustrated arrangement follows a linear path along its axis 23 so as to be linear in shape from the first end 14 to the second end 15. Furthermore, in the illustrated arrangement the first insertion portion 18 forms only a portion of a longitudinal length of the frame member so as to leave a second portion thereof which is located externally of the hole 3 at the proximal sheet face 5 and which does not pass into or through the hole 3.

As such, the frame member 12 can be arranged in an inserted position relative to the hole 3 as shown generally in FIG. 1 or in FIG. 3A in which the frame member is substantially in the hole 3, the first end 14 is located at or adjacent the distal sheet face 6 and the second end 15 is located at or adjacent the proximal sheet face 5, and the longitudinal axis 23 of the frame member is generally parallel to the thickness direction $T_D$ of the sheet. The frame member acts as a base member for supporting other components of the apparatus as will be described in more detail shortly.

The apparatus 10 further includes a first face-engagement member 26 which is supported on the frame member 12 generally at the first end 14 thereof and arranged for passing through the hole 3 with the first end of the frame member in the insertion direction 21 such that the first face-engagement member is disposed outside the hole 3 in the inserted position of the frame member, as shown in, for example, FIG. 3B.

The first face-engagement member 26 defines a contact surface 28 disposed to one side transversely of the frame member 12 and arranged to face generally in a longitudinal direction of the frame member towards the second end 15 thereof, as indicated by arrow 29, for engaging the distal face 6 of the sheet in a working position of the first face-engagement member to resist removal of the apparatus 12 arranged in an opposite direction to the insertion direction out of the hole, as shown generally in FIG. 1 or in FIG. 3D. As such, the first face-engagement member 26 extends transversely outwardly relative to the frame member 12 where is defined the distal sheet contact surface 28 at a suitable location for engaging the distal sheet face 6.

Further to the first-engagement member 26, the apparatus 10 includes a buttress member 31 supported on the frame member 12 at a longitudinally spaced location from the first face-engagement member 26 in the direction 29 towards the second end 15 of the frame member. The buttress member 31 is arranged to be located in the hole 3 with the frame member 12 in the inserted position thereof in a working position of the buttress member. The buttress member 31 projects transversely outwardly from the frame member 12 to a free end 34 of the buttress member for abutting the peripheral wall 8 of the hole at a first location 8A thereon in the working position of the buttress member. Furthermore, the buttress member 31 is arranged such that, when the free end 34 of the buttress member is in butting engagement with the peripheral wall 8 of the hole at the first location 8A in the working position of the buttress member, the frame member 12 is located generally at the peripheral wall 8 of the hole at a second location thereon indicated at 8B which is substantially diametrically opposite to the first location 8A, and the apparatus at a substantially diametrically opposite location to the free end 34, relative to the longitudinal axis 23 of the frame member, indicated at 37 is located in butting engagement with the peripheral wall 8 of the hole at the second location thereon 8B so as to resist movement of the apparatus relative to the hole 3 in a transverse direction between the free end 34 and the substantially diametrically opposite location on the apparatus at 37. Typically the buttress member is sized and shaped so that the free end 34 thereof can be inserted into the hole 3 while the frame member 12 is arranged therein in the inserted position, and so that when the free end 34 is arranged in contact with the hole wall 8 this acts to push the frame member generally to the peripheral hole wall 8 and consequently the opposite abutting portion 37 into contact with the hole wall 8.

In order to facilitate connection to the object to be anchored via the apparatus 10 to the sheet 1, the apparatus 10 also includes an attachment arrangement 39 for coupling the object to the apparatus. For example, the attachment arrangement may be an aperture or opening defined in one of the frame member or the buttress member through which a hooking element or clip can be passed.

Turning now in more detail to the buttress member 31, and referring particularly to FIG. 2, in the illustrated arrangement the free end 34 of the buttress member extends angularly of the longitudinal axis 23 of the frame member from a first side 40 of the free end to a second side 41 thereof so that in the working position the free end engages a width of the hole wall 8 in a circumferential direction thereof and not just a localized spot thereon. Thus, even though the contact point of the frame member at side 37 is relatively localized, the free end 34 which diverges from the longitudinal frame member axis 23 in an angular direction thereof acts to substantially resist against transverse movement of the apparatus within an angular range from one side 40 of the free end to the other 41.

Furthermore, the free end 34 extends from the first side 40 to the second side 41 through a prescribed angle which is between about 35 degrees and about 80 degrees, and more specifically between about 45 degrees and about 60 degrees, relative to the longitudinal axis 23, which is located substantially at the peripheral wall. Thus effectively the free end 34 forms a sufficiently angularly wide surface for contacting between one quarter and one third of a circumferential periphery of the hole wall. Within this range, the free end 34 of the buttress member is in contact with a sufficient angular portion of the hole wall 8 so that, even though the buttress member 31 and the abutted portion 37 can act to resist substantially any movement transversely to the thickness direction, for example when a first component $F_X$ of an externally applied force $F_{APP}$ of the object which is exerted on the apparatus generally along the proximal face 5 is not directed between the frame member for example at 23 and across to the free end 34 of the buttress member. In the illustrated arrangement, the free end 34 is convexly arcuately shaped relative to the longitudinal axis 23 of the frame member so as to engage an arcuate portion of the peripheral wall of the hole, which is circular cylindrical in shape, at the first location 8A thereon. Relative to the longitudinal axis 23 a contact surface defined by the free end 34 lies along an elliptical path encircling the axis 23 and which is elongated in the direction in which free end projects from the frame member 12.

The free end 34 comprises a smooth end 45 surface for butting engagement with the peripheral wall 8 of the hole and a plurality of projections 47 at spaced locations carried on the end surface 45 at angularly spaced positions of the longitudinal axis 23 of the frame member for biting into the support material 2 at the peripheral wall 8 in the working position of the buttress member. That is, the projections 47 protrude transversely outwardly from the end surface 45 so as to form generally pointed free tips spaced from the end surface 45 to bite into the material 2 for embedding therein like teeth. The end surface 45 is shaped to substantially follow the hole wall 8.

In the illustrated arrangement, the buttress member 31 includes a projecting portion 48 defining the free end 34 and disposed substantially to one side transversely of the frame member 12 and a frame receiving portion 49 connected to the projecting portion and encompassing a transverse periphery of the frame member 12 such that a location on the frame receiving portion substantially diametrically opposite to the free end, that is indicated at 37, is in butting contact with the peripheral wall 8 of the hole at the second location 8B thereon in the working position of the buttress member 31. As such, the buttress member 31 of the illustrated arrangement defines both points of substantially diametrically opposite abutting contact with the hole wall 8. In this arrangement, the frame member 12 acts primarily as a support member for carrying the buttress member 31 and the first face-engagement member. The frame member 12 is suitably located basically at the peripheral wall, though in slight spaced relation therefrom, as this allows the first face-engagement member to be suitably sized and shaped for passing through the hole while providing a sufficient contact surface area for engaging the distal sheet face 6. Thus the frame member is spaced from the peripheral wall by a thickness of the frame receiving portion at 37.

The frame receiving portion 49 of the buttress member is movably supported on the frame member for movement longitudinally therealong. In the illustrated arrangement the frame receiving portion 49 forms a sleeve extending along the longitudinal axis 23 and arranged to be substantially slidably supported on the linear cylindrical frame member.

Turning now in more detail to the first face-engagement member 26, and referring to FIGS. 1 and 3A through 3D, the contact surface 28 of the first face-engagement member is arranged at an angularly spaced position from the free end 34 of the buttress member relative to the longitudinal axis 23 of the frame member. More specifically, in the illustrated arrangement the contact surface 28 of the first face-engagement member is located on a substantially diametrically opposite side of the frame member 12 to the buttress member 31 so as to engage the sheet 1 of rigid support material at a common angular location as the frame member relative to the longitudinal axis 23 and to the hole 3. Thus the first face-engagement member 26 acts to resist against removal of the apparatus from within the hole by torqueing of the buttress member 31 about an axis 50 lying along the proximal sheet face 5 tangential to the wall 8 of the hole at the first location 8A as the exerted force $F_{APP}$ typically also includes a second force component $F_Y$ substantially normal to the proximal face 5 of the sheet. The apparatus, at a location which is arrangeable within the hole 3 but adjacent the distal face 6, may be enlarged in a transverse direction relative to the frame member so as to abut the hole wall 8 so that there is no gap between the frame member 12 and the hole wall 8 at the distal face which may more fixedly locate the first face-engagement member 26 angularly of the longitudinal axis 23 to improve resistance to the aforementioned torqueing about the free end 34. Particularly when the object such as land vehicle 4 is connected to the apparatus via the attachment arrangement 39, the force $F_{APP}$ exerted by the object may act to retain the frame member 12 in the inserted position without it passing wholly through the hole 3 to a position at or adjacent the distal sheet face 6.

As shown in the illustrated arrangement the buttress member may include a bracing member 51, 52 each extending transversely inwardly from the free end 34 towards a location along the frame member 12 which is longitudinally spaced from the free end 34 in the longitudinal direction 29 towards the second end 15 of the frame member so as to strengthen the buttress member against a torque force such as about axis 50. The bracing members 51, 52 are provided at longitudinally opposite locations on either side of the buttress member but extending substantially in a common direction.

The distal face contact surface 28 of the first face-engagement member 26 is planar and lies in a radial plane of the axis 23, and as the face engagement member 26 protrudes outwardly so as to provide a sufficient surface area for the surface 28 the member 26 also includes a guide surface 53 arranged to face generally in the insertion direction 21 so as to be effectively opposite to the contact surface 28 and which is inclined transversely outwardly and longitudinally in the longitudinal direction 29 towards the second end 15 of the frame member so as to guide the first face-engagement member into the hole in the insertion direction 21. Thus in the illustrated arrangement the first face-engagement member forms a substantially triangular shaped body located to one side of the frame member 12, with planar surfaces defining face 28 and surface 35.

In order for the frame member 12 to remain within the hole without inadvertently passing wholly therethrough to a position at or adjacent the distal sheet face 6, the apparatus 10 includes a second face-engagement member 56 carried by the frame member 12 at a longitudinally spaced location from the first face-engagement member 26 in the longitudinal direction 29 towards the second end 15 of the frame member, such that the second face-engagement member 56 is disposed outside the hole 3 at the proximal face 5 of the sheet in the inserted position of the frame member 12. The second face-engagement member 56 defines a contact surface 58 disposed to one side transversely of the frame member 12 and which is arranged to face in an opposite direction to the longitudinal direction 29 for engaging the proximal face 5 of the sheet in a working position of the second face-engagement member. Thus the contact surface 58 of the second face-engagement member 56 acts to cooperate with the contact surface 28 of the first face-engagement member 26 to effect a clamping action on the sheet 1.

The contact surface 58 of the second face-engagement member 56 is arranged at a substantially common angular location as the free end 34 of the buttress member relative to the longitudinal axis 23 of the frame member. This further resists against removal of the frame member from within the hole by torqueing about the buttress member at axis 50.

Therefore, in relation to the contact surface 26 for engaging the distal sheet face 6, the contact surface 58 of the second face-engagement member is disposed on a substantially diametrically opposite side of the frame member to the contact surface 26 of the first face-engagement member, but generally speaking the contact surface 58 is arranged at an angularly spaced position from the contact surface of the first face-engagement member relative to the longitudinal axis of the frame member. This may provide some stability in a transverse direction in addition to providing the clamping action.

In order to locate the second face-engagement member 56 in contact with the proximal sheet face 5, the buttress member 31 is movably secured on the frame member 12 for movement longitudinally therealong, for example the member 31 includes a sleeve slidably supported over the frame member 12 and releasably securable in fixed location thereon by pin through registered apertures on the frame member 12, and the second face-engagement member 56 is mounted on the buttress member 31 so that the second face-engagement member is disposed in the working position thereof when the buttress member is disposed in the working position thereof. Interconnection of the buttress and second face engagement members 31, 56 in fixed relation to one another allows the face-engagement member 56 to act as a stop when inserting the buttress member 31 into the hole so that the free end is located generally at a proximal end of the hole which is at the proximal sheet face 5.

Particularly when the face-engagement members 26, 56 and the buttress member 31 are arranged along a common line diametrically of the hole 3, a pair of stabilizer arms 62 are provided carried by the frame member 12, the arms 62 being at longitudinally spaced locations from the first face-engagement member 26 so as to be arranged at a location externally of the hole 3 in the inserted position of the frame member 12 at or adjacent the proximal sheet face 5. The stabilizer arms 62 extend transversely outwardly from the frame member 12 in substantially opposite directions to one another for engaging the proximal face 5 of the sheet and are located at angularly spaced locations from the contact surface of the second face-engagement member relative to the longitudinal axis 23 of the frame member. Furthermore, for increased stability each stabilizer arm 62 is located at an angularly spaced position from the contact surface 28 of the first face-engagement member 26 relative to the longitudinal frame member axis 23.

In the illustrated arrangement, the frame member is in the form of a post along which each of the first face-engagement member 26 and the buttress member 31, on which the second face-engagement member 56 is supported, are slidably supported for movement longitudinally of the frame member, which can be considered axial movement when the frame member extends substantially along the axis 23.

In use, typically the hole 3 is formed in the sheet first, so as to provide a connection location of the apparatus to the sheet 1. This is readily accomplished by boring or drilling a circular cylindrical hole through the thickness of the sheet. Generally speaking, during the step of forming the hole, the hole is suitably sized on the basis a transverse size of the apparatus, that is sizing the hole in diameter slightly larger than a transverse dimension from the location on the apparatus at 37 to the free end 34 of the buttress member, so that merely placing the buttress member within the hole in side-by-side relation to the frame member is sufficient to cause both diametrically opposite ends of the apparatus to abut the wall 8 of the hole 3.

With the hole 3 provided in the sheet 1, the first face-engagement member 26 is passed through the hole, while being supported on the frame member 12, from a position at or adjacent the proximal face 5 of the sheet to a position at or adjacent the distal face 6 so as to locate the first face-engagement member in a position suitable for engaging the distal face 6 while the frame member extends through the hole to the proximal face 5. This is shown in the series of FIGS. 3A and 3B. The first face-engagement member is sized substantially no larger than the buttress member in the transverse direction from the frame member 12 to the free end, since the thickness of the frame receiving portion 49 is relatively small in comparison thereto.

Afterwards, that is with the first face-engagement member 26 located substantially outside the hole so that it can engage the distal sheet face 6 and the frame member 12 extending therefrom through the hole to the proximal face 5, the buttress member is arranged in butting engagement at the first location 8A on the peripheral wall 8 of the hole while being supported on the frame member 12 so as to locate the substantially diametrically opposite portion 37 of the apparatus to the free end 34 in butting engagement at the substantially diametrically opposite location 8B on the peripheral wall of the hole. This generally involves arranging the frame member at the peripheral wall 8 as shown in FIG. 3B so as to enable the buttress member 31 to be fit into the hole alongside the frame member 12 as shown in FIG. 3C. Furthermore, the buttress member 31 is placed in the hole 3 for butting engagement with the wall 8 thereof while the first face-engagement member 26 is disposed in contact with the distal face 6 of the sheet, as more clearly shown in FIG. 3D. With the illustrated arrangement, so as to simplify the mounting process, the buttress member 31 can positioned into the hole while simply maintaining the frame member 12 generally at the peripheral wall 8, and once the buttress member is arranged in the working position, and as the buttress member 31 is movably supported on the frame member which also supports the first face-engagement member 26 so as to be a common support for both, the frame member 12 may be displaced relative to the stationary buttress member 31 in the direction opposite to the insertion direction 21 so as to displace the first face-engagement member 26 and position same in engagement with the distal face 6 of the sheet.

With the apparatus arranged in this manner in relation to the hole 3 the object may then be connected to the apparatus 10 so as to anchor the object to the sheet of rigid support material.

When the apparatus includes the second face-engagement member 56 for engaging the proximal sheet face 5, the second face-engagement member 56 is arranged in engagement with the proximal face 5 so as to effect with the first face-engagement member 26 which is engaged with the distal face 6 of the sheet a clamping action on the sheet. When the second face-engagement member 56 is supported on the buttress member then simply positioning the buttress member in the working position is sufficient to dispose the second face-engagement member 56 in its working position in contact with the proximal sheet face 5. This is similarly applicable to the stabilizer arms 62 when they are supported on the buttress member at the frame receiving portion 49.

As described herein the present invention relates generally to an apparatus for use with a sheet of rigid support material at a hole formed therein through a thickness of the sheet to provide an anchoring point at a proximal face of the sheet for anchoring an object thereto comprises a frame member supporting a face-engagement member for engaging a distal face of the sheet which is spaced from the proximal face by the thickness of the sheet, so as to resist removal from within the hole by the object anchored to the apparatus, and a buttress member also supported on the frame member for buttingly engaging a peripheral wall of the hole so as to resist movement transversely to a thickness direction of the sheet.

The scope of the claims should not be limited by the preferred embodiments set forth in the examples but should be given the broadest interpretation consistent with the specification as a whole.

The invention claimed is:

1. Apparatus for use with a sheet of rigid support material having a proximal face, an opposite distal face spaced from the proximal face by a thickness of the support material, and a hole having a peripheral wall formed through the thickness of the support material such that the hole is open at the proximal and distal faces of the sheet to provide an anchoring point at the proximal face of the sheet for anchoring an object thereto, comprising:

a rigid frame member having longitudinally opposite first and second ends and being transversely sized and shaped in a manner so as to enable a first portion of the frame member defining the first end thereof to be passed from a position at or adjacent the proximal face of the sheet and into the hole in an insertion direction towards the distal face when a longitudinal axis of the frame member, along which the first and second ends lie, is oriented generally parallel to a thickness direction of the sheet oriented from the proximal face to the distal face, such that the frame member can be arranged in an inserted position relative to the hole in which (i) the frame member is substantially in the hole, (ii) the first end of the frame member is located at or adjacent the distal face of the sheet and the second end of the frame member is located at or adjacent the proximal face of the sheet, and (iii) the longitudinal axis of the frame member is generally parallel to the thickness direction of the sheet;

a first face-engagement member supported on the frame member generally at the first end thereof and arranged for passing through the hole with the first end of the frame member in the insertion direction such that the first face-engagement member is disposed outside the hole and adjacent the distal face of the sheet when the frame member is in the inserted position;

the first face-engagement member defining a contact surface disposed to one side transversely of the frame member and arranged to face generally in a longitudinal direction of the frame member towards the second end thereof for engaging the distal face of the sheet in a working position of the first face-engagement member to resist removal in an opposite direction to the insertion direction out of the hole;

a buttress member supported on the frame member at a longitudinally spaced location from the first face-engagement member in said longitudinal direction towards the second end of the frame member;

the buttress member being arranged to be located in the hole when the frame member is in the inserted position and projecting transversely outwardly from the frame member to a free end of the buttress member for abutting the peripheral wall of the hole at a first location thereon in a working position of the buttress member, the buttress member being arranged such that, when the free end of the buttress member is in butting engagement with the peripheral wall of the hole at the first location in the working position of the buttress member, the frame member is located generally at the peripheral wall at a second location thereon which is substantially diametrically opposite to the first location and the apparatus at a substantially diametrically opposite location to the free end, relative to the longitudinal axis, is located in butting engagement with the peripheral wall of the hole at said second location thereon so as to resist movement relative to the hole in a transverse direction between the free end and the substantially diametrically opposite location on the apparatus; and an attachment arrangement for coupling the object to the apparatus.

2. The apparatus of claim 1 wherein the free end of the buttress member extends angularly of the longitudinal axis of the frame member from a first side of the free end to a second side thereof.

3. The apparatus of claim 2 wherein the free end extends from the first side to the second side through a prescribed angle which is between about 35 degrees and about 80 degrees relative to the longitudinal axis.

4. The apparatus of claim 3 wherein the prescribed angle is between about 45 degrees and about 60 degrees.

5. The apparatus of claim 2 wherein the free end comprises a smooth end surface for butting engagement with the peripheral wall of the hole and a plurality of projections at spaced locations carried on the end surface at angularly spaced positions of the longitudinal axis of the frame member for biting into the support material at the peripheral wall in the working position of the buttress member.

6. The apparatus of claim 1 wherein the buttress member includes a projecting portion defining the free end and disposed substantially to one side transversely of the frame member and a frame receiving portion connected to the projecting portion and encompassing a transverse periphery of the frame member such that a location on the frame receiving portion substantially diametrically opposite to the free end is in butting contact with the peripheral wall of the hole at the second location thereon in the working position of the buttress member.

7. The apparatus of claim 6 wherein the frame receiving portion of the buttress member is movably supported on the frame member for movement longitudinally therealong.

8. The apparatus of claim 1 wherein the contact surface of the first face-engagement member is arranged at an angularly spaced position from the free end of the buttress member relative to the longitudinal axis of the frame member.

9. The apparatus of claim 8 wherein the contact surface of the first face-engagement member is located on a substantially diametrically opposite side of the frame member to the buttress member so as to engage the sheet of rigid support material at a common angular location as the frame member relative to the longitudinal axis.

10. The apparatus of claim 1 wherein the first face-engagement member defines a guide surface arranged to face generally in the insertion direction and which is inclined transversely outwardly and longitudinally in the longitudinal direction towards the second end of the frame member so as to guide the first face-engagement member into the hole in the insertion direction.

11. The apparatus of claim 1 further including a second face-engagement member carried by the frame member at a longitudinally spaced location from the first face-engagement member in said longitudinal direction towards the second end of the frame member, such that the second face-engagement member is disposed outside the hole at the proximal face of the sheet in the inserted position of the frame member, and defining a contact surface disposed to one side transversely of the frame member and which is arranged to face in an opposite direction to said longitudinal direction for engaging the proximal face of the sheet in a working position of the second face-engagement member so as to cooperate with the contact surface of the first face-engagement member to effect a clamping action on the sheet.

12. The apparatus of claim 11 wherein the contact surface of the second face-engagement member is arranged at a substantially common angular location as the free end of the buttress member relative to the longitudinal axis of the frame member.

13. The apparatus of claim 11 wherein the contact surface of the second face-engagement member is arranged at an angularly spaced position from the contact surface of the first face-engagement member relative to the longitudinal axis of the frame member.

14. The apparatus of claim 13 wherein the contact surface of the second face-engagement member is disposed on a substantially diametrically opposite side of the frame member to the contact surface of the first face-engagement member.

15. The apparatus of claim 11 wherein the buttress member is movably secured on the frame member for movement longitudinally therealong, and the second face-engagement member is mounted on the buttress member so that the second face-engagement member is disposed in the working position thereof when the buttress member is disposed in the working position thereof.

16. The apparatus of claim 11 further including two stabilizer arms carried by the frame member at longitudinally spaced locations from the first face-engagement member so as to be arranged at a location externally of the hole in the inserted position of the frame member, the stabilizer arms extending transversely outwardly from the frame member in substantially opposite directions to one another for engaging the proximal face of the sheet and being located at angularly spaced locations from the contact surface of the second face-engagement member relative to the longitudinal axis of the frame member.

17. The apparatus of claim 16 wherein each of the stabilizer arms is located at an angularly spaced position from the contact surface of the first face-engagement member relative to the longitudinal axis of the frame member.

18. The apparatus of claim 1 wherein the buttress member includes a bracing member extending transversely inwardly from the free end towards a location along the frame member which is longitudinally spaced in the longitudinal direction towards the second end.

19. The apparatus of claim 18 including a plurality of the bracing member are provided at longitudinally opposite locations on either side of the buttress member.

20. A method of anchoring an object to a sheet of rigid support material having a proximal face, an opposite distal face spaced from the proximal face by a thickness of the support material, and a hole having a peripheral wall formed through the thickness of the support material such that the hole is open at the proximal and distal faces of the sheet, comprising:
providing an apparatus including:
a rigid frame member;
a first face-engagement member supported at one end of the frame member for engaging the distal face of the sheet; and
a buttress member to be supported on the frame member for engaging the peripheral wall of the hole, the buttress member having a projecting free end;
passing the first face-engagement member supported on the frame member through the hole from a position at or adjacent the proximal face of the sheet to a position at or adjacent the distal face so as to locate the first face-engagement member in a position suitable for engaging the distal face while the frame member extends through the hole to the proximal face, whereby the frame member is located in the hole;
while being supported on the frame member, arranging the free end of the buttress member in butting engagement at a first location on the peripheral wall of the hole, while the first face-engagement member is disposed in contact with the distal face, so as to locate a substantially diametrically opposite portion of the apparatus to the free end in butting engagement at a substantially diametrically opposite location on the peripheral wall of the hole; and
connecting the object to the apparatus so as to anchor the object to the sheet of rigid support material.

21. The method of claim 20 further including providing the apparatus having a second face-engagement member to be carried by the frame member for engaging the proximal face of the sheet, and arranging the second face-engagement member in engagement with the proximal face so as to effect with the first face-engagement member engaged with the distal face of the sheet a clamping action on the sheet.

* * * * *